March 17, 1970 R. L. FERCH ET AL 3,501,716
GYRATOR NETWORK USING OPERATIONAL AMPLIFIERS
Filed Dec. 3, 1968
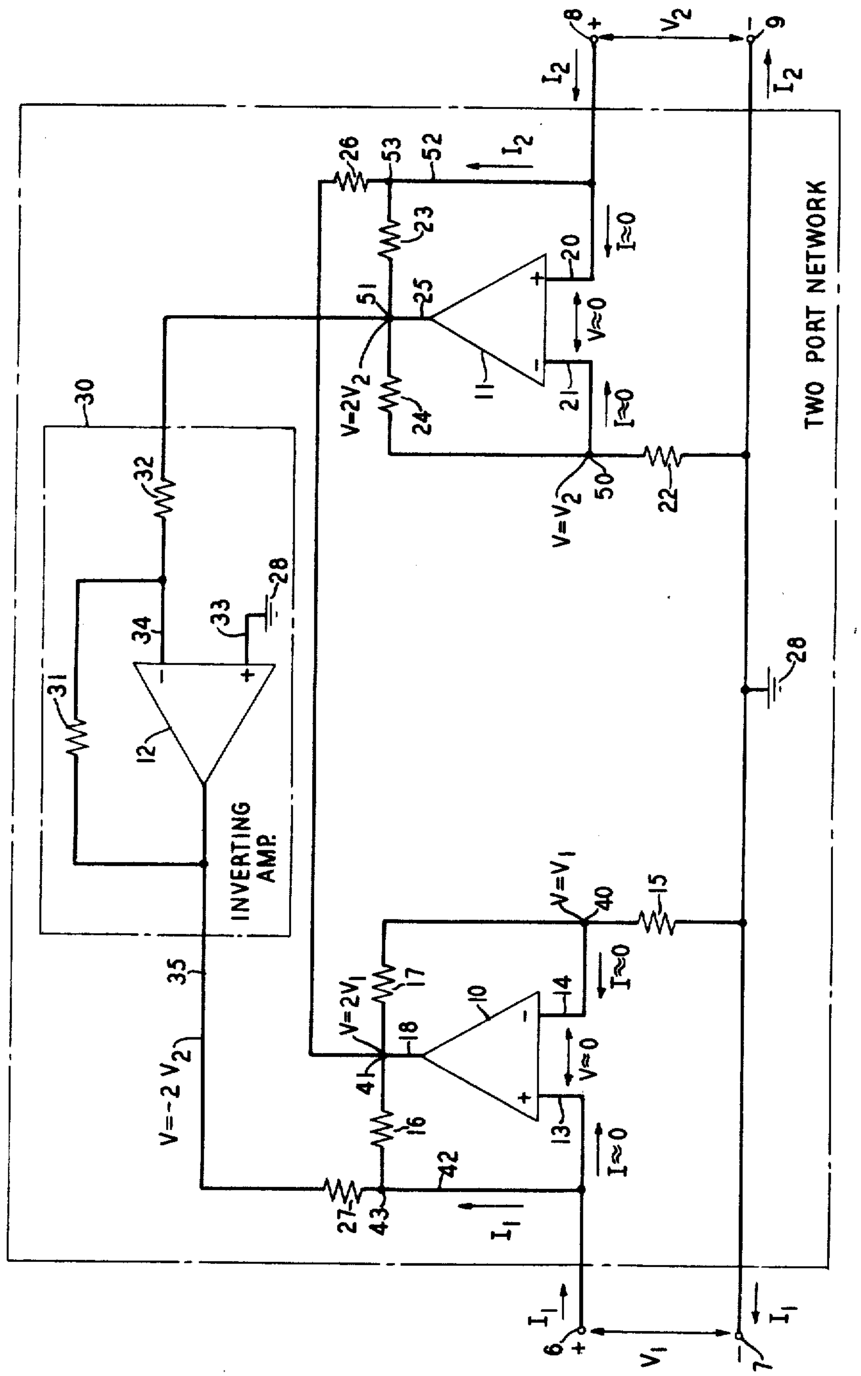
INVENTORS R. L. FERCH
G. SZENTIRMAI
L. C. THOMAS
BY [signature]
ATTORNEY United States Patent Office 3,501,716

Patented Mar. 17, 1970

3,501,716

GYRATOR NETWORK USING OPERATIONAL AMPLIFIERS

Richard L. Ferch, Monmouth Beach, N.J., George Szentirmai, Ithaca, N.Y., and Lee C. Thomas, Matawan, N.J., assignors to Bell Telephone Laboratories, Incorporated, Murray Hill, N.J., a corporation of New York Filed Dec. 3, 1968, Ser. No. 780,652

Int. Cl. H03h 7/44

U.S. Cl. 333—80 4 Claims

ABSTRACT OF THE DISCLOSURE

A two-port gyrator circuit is disclosed using two differential amplifiers and an inverting amplifier. One of the differential amplifiers is connected with a resistor network across the input port and the other is connected with a similar resistor network across the output port in such a manner that a common ground connection is maintained between the input and output ports. The inverting amplifier and a resistor are each connected respectively in one of the two circuit paths between the output of one differential amplifier and the plus input of the other differential amplifier. Because of its common ground connection the disclosed network is capable of simulating both serially and parallelly connected inductors.

BACKGROUND OF THE INVENTION

This invention relates generally to nonreciprocal electric networks and more particularly to gyrator circuits using operational amplifiers.

Broadly speaking, network synthesis may be defined as "the methods by which an electric network can be formed to realize a prescribed characteristic." (K. L. Su, "Active Network Synthesis," p. 1, (McGraw-Hill, Inc., 1965)). In the past, network synthesis was based on the existence of simple circuit elements, such as resistors, capacitors, inductors and transformers. With the advent of modern synthesis techniques, however, many new elements having specialized electrical characteristics were developed. Some of these, such as the negative resistance, the nullator, norator, circulator and gyrator are described simply by Su at pages 8 through 39 in the above-cited article.

Often new elements for electric networks are defined theoretically and mathematically before a realizable physical representation is found. The gyrator, for one, was first described theoretically as early as 1948 by B. Tellegen in "The Gyrator, a New Electric Network Element," Philips Research Report, volume 3, No. 2, pages 81 through 101 (1948).

Since that time a number of patents have issued and a number of technical articles have been published disclosing various circuits which approximate the characteristics of the theoretical gyrator. These gyrator circuits in the prior art generally are realized either with discrete components such as transistors or with more complicated circuit units such as operational amplifiers. Generally the circuits employing discrete components have the advantage of being simple and inexpensive, but for the most part these networks are sensitive to element changes such as the amplification factor associated with the individual transistors and are capable of simulating only relatively low quality inductors. The circuits employing operational amplifiers are generally more complex and expensive, but they have the potential of simulating much higher quality inductors. One reason for this is that the operational amplifier has a higher and much more stable amplification factor than the transistor which is used in the more simple gyrator circuits. As will be appreciated from the detailed description below, the present invention uses operational amplifiers to produce a stable, high quality gyrator circuit which closely realizes the characteristics of the theoretical gyrator. A high quality gyrator circuit such as described in the present invention offers the designer greater latitude in using such circuits in practical electric networks.

The ideal gyrator is a four-terminal, two-port network which may be defined by the following pair of equations:

$$V_1 = -I_2 R \qquad (1)$$

$$V_2 = I_1 R \qquad (2)$$

where $I_1$ is the current into and $V_1$ is the voltage across the two terminals constituting one port, and $I_2$ is the current into and $V_2$ is the voltage across the two terminals constituting the second port. As may be noted from Equations 1 and 2, the gyrator associates its name with the fact that it "gyrates" an input voltage into an output current and vice versa. The R terms in Equations 1 and 2 are transfer resistances, called gyration resistances, whose product determines the gyration constant K. In the ideal gyrator defined in the Tellegen article cited above both transfer resistances are equal as shown in Equations 1 and 2, but in general they may be unequal.

The gyrator is important in network synthesis because it is one of the simplest and most basic nonreciprocal networks from which other nonreciprocal networks such as the circulator can be formed. In simple terms, a network is reciprocal when a voltage source inserted in one part of the network produces a current at some other part of the network such that the ratio of the applied voltage to the measured current, called the transfer impedance, will be the same if the relative positioins of the driving source and the measured effect are reversed. Electrical networks which contain only resistors, capacitors, inductors and transformers generally are reciprocal networks. The gyrator, however, is always nonreciprocal since the transfer impedance for one direction of propagation always differs in sign from that for propagation in the reverse direction, as demonstrated by the different signs in Equations 1 and 2 above. In more general definitions the gyrator may be further nonreciprocal in that the magnitude of the transfer impedances, the R terms in Equations 1 and 2, may be unequal.

In practical application the gyrator is important as a positive impedance inverter. That is if an impedance $+Z$ is connected between one pair of terminals, the impedance measured at the other terminals is proportional to $+1/Z$. Thus, for example, if the gyrator network defined by Equations 1 and 2 is terminated with an output impedance $Z_{out}$, the impedance will be defined by Equation 3, $$Z_{in} = \frac{R^2}{Z_{out}} = \frac{K}{Z_{out}} \qquad (3)$$

where K is again the gyration constant. As a result, a capacitor with an impedance $1/j\omega C$ can be made to appear as an inductor with an impedance $j\omega KC$.

The ability to substitute a capacitor for an inductor is significant in the integrated circuit art because the inductor has been especially difficult to realize with known integrated techniques. Furthermore, in conventional circuits large and expensive coils are needed to realize the elemental inductor at low frequencies. Thus replacing these low frequency inductors, as well as inductors in integrated circuits, with high quality gyrator circuits may result in significant savings in size and cost.

SUMMARY OF THE INVENTION

It is the object of the present invention to provide a stable, high quality gyrator circuit which is capable of simulating inductors in both series and parallel circuit connections.

The present invention is a two-port four-terminal gyrator network which contains a plurality of operational amplifiers. Two of the amplifiers are connected as differential amplifiers and another is connected as an inverting amplifier. The first differential amplifier is connected with a resistor network across the input port and the second differential amplifier is connected with a similar resistor network across the output port. The plus input of the first differential amplifier is connected directly to one input terminal and the plus input of the second differential amplifier is connected to one output terminal. The remaining input and output terminals are maintained at a common ground potential. The inverting amplifier and a series resistor are connected from the output of the second differential amplifier to the plus input of the first differential amplifier and a series resistor is connected from the output of the first differential amplifier to the plus input of the second differential amplifier.

The circuit arrangement forming the subject of the present invention has been found experimentally to have a dependable quality factor Q in excess of 500. Also, unlike many circuits shown in the prior art and because of the common ground connection between its input and output ports, the present network is able to simulate inductors connected in series as well as in parallel.

BRIEF DESCRIPTION OF THE DRAWINGS

This invention will be more fully comprehended from the following detailed description taken in conjunction with the drawing which is a partial block and schematic diagram of a gyrator circuit embodying the invention.

DETAILED DESCRIPTION

The figure shows a two-port, four-terminal gyrator network embodying the present invention. An input alternating current voltage signal $V_1$ is supplied at input terminals 6 and 7 and an output voltage signal $V_2$ is measured across output terminals 8 and 9, as shown. An input current $I_1$ is supplied into the network at input terminal 6 and out of the network at input terminal 7 and an output current $I_2$ is measured into the network at output terminal 8 and out of the network at output terminal 9 in a manner consistent with the convention adopted in Equations 1 and 2 above.

The only active elements in the network shown in the figure are operational amplifiers 10, 11, and 12. Amplifier 10 is a differential amplifier having an input 13, called the positive input terminal, and an input 14, called the negative input terminal. The difference between the voltages at terminals 13 and 14 is the differential input voltage of the amplifier. Input 13 is connected directly to input terminal 6 and input 14 is connected through resistor 15 to input terminal 7, while resistors 16 and 17 respectively are connected between inputs 13 and 14 to output 18 of amplifier 10.

Amplifier 11 is also a differential amplifier which has a positive input terminal 20 and a negative input terminal 21. Amplifier 11 is connected to output terminals 8 and 9 in the same manner that amplifier 10 is connected to input terminals 6 and 7. Specifically, input terminal 20 is connected directly to output terminal 8 and input terminal 21 is connected through resistor 22 to output terminal 9, while resistors 23 and 24 respectively are connected between inputs 20 and 21 to output terminal 25 of amplifier 11.

Amplifiers 10 and 11 are mutually connected by resistor 26, which is found in the circuit path between input 20 of amplifier 11 and output 18 of amplifier 10, and by resistor 27 and inverting amplifier 30, comprising amplifier 12, feedback resistor 31 and series resistor 32, which are found in the circuit path between input 13 of amplifier 10 and output 25 of amplifier 11. Input terminal 7 is connected directly to output terminal 9 so that common ground potential 28 is maintained between the input and output ports of the network. Because of this common ground feature the present network coupled with a capacitor is capable of simulating inductors connected in series as well as in parallel.

Amplifier 12, together with feedback resistor 31 and series resistor 32, form inverting amplifier 30 which is connected in the circuit path between resistor 27 and output 25 of amplifier 11. Amplifier 12 contains a positive input 33 which is maintained at ground potential 28, and a negative input 34 which is connected to receive signals from output 25 of amplifier 11. Amplifier 12 functions as an inverting amplifier because the input signals are applied at negative input 34. Feedback resistor 31 is connected between output 35 and negative input 34 and series resistor 32 is connected between negative input 34 and output 25 of amplifier 11. The gain of inverting amplifier 30 is determined by the ratio of the resistances of resistors 31 and 32. For present purposes it will be assumed that the resistance of resistors 31 and 32 are equal so that inverting amplifier 30 has unity gain.

That the circuit shown in the figure satisfies Equations 1 and 2 above may be shown by the following analysis:

Assume that amplifiers 10 and 11 are ideal amplifiers, i.e., that the amplification factor is large (approaching infinity), that the differential input voltage is small (approaching zero), and that the current at inputs 13, 14, 20 and 21 is approximately equal to zero. Assume also for purposes of illustration that resistors 15, 16, 17, 22, 23, 24, 26 and 27 are equal and have resistances $R_x$. Then, since the current at input 13 is approximately equal to zero, substantially all of current $I_1$ at input terminal 6 flows through lead 42 to node 43. Since the differential input voltage between inputs 13 and 14 of amplifier 10 is approximately equal to zero, voltage $V_1$ at inputs 6 and 7 appears across resistor 15 between node 40 and ground potential 28. Because the current at input 14 is approximately equal to zero, resistors 15 and 17, having equal resistances $R_x$, divide the voltage evenly between node 41 and ground potential 28. As a result since the voltage at node 40 is equal to $V_1$, the voltage at node 41 is equal to $2V_1$. It may be seen by inspection therefore, that the current flowing into node 43 through resistor 16 is equal to $$\frac{2V_1-V_1}{R_x}$$

Similarly, since the current at input 20 is approximately equal to zero, substantially all of current $I_2$ at output tesminal 8 flows thsough lead 52 to node 53. And, since the voltage between inputs 20 and 21 is approximately equal to zero, voltage $V_2$ at output terminals 8 and 9 appears at node 50 across resistor 22. Because the current at input 21 is approximately equal to zero, resistors 22 and 24 serve as a voltage divider between node 51 and ground potential 28, making the voltage at node 51 equal to 2½. By inspection, therefore, the current flowing into node 53 through resistor 23 is equal to $$\frac{2V_2-V_2}{R_x}$$

and the current flowing through resistor 26 into node 53 is $$\frac{2V_1-V_2}{R_x}$$

As indicated above, inverting amplifier 30 has unity gain so that the voltage at node 51 appears at output 35 as a voltage equal to $-2V_2$. The current flowing through resistor 27 into node 43 therefore is $$\frac{-2V_2-V_1}{R_x}$$

Applying Kirchhoff's currnet low and summing the currents flowing into node 43 results in Equation 4, $$I_1+\frac{2V_1-{}_1}{R_x}+\frac{-2V_2-V_1}{R_x}=0 \qquad (4)$$

and summing the currents flowing into node 53 results in Equation 5, $$I_2+\frac{2V_2-V_2}{R_x}+\frac{2V_1-V_2}{R_x}=0 \quad (5)$$

Simplifying Equation 4 produces Equation 6, $$V_2=I_1\left(\frac{R_x}{2}\right) \quad (6)$$

and simplifying Equation 5 produces Equation 7, $$V_1=-I_2\left(\frac{R_x}{2}\right) \quad (7)$$

The terms ($Rx/_2$) in Equations 6 and 7 are transfer resistances equivalent to the transfer resistances R in Equations 1 and 2 above. By inspection therefore, Equation 6 is equivalent to Equation 2 and Equation 7 is equivalent to Equation 1 above. Thus the network shown in the figure produces gyrator action and has a transfer resistance $$R=\left(\frac{R_x}{2}\right)$$

and a gyration constant $$K=\left(\frac{R_x^2}{4}\right)$$

In acordance with the invention, it is possible to change the transfer resistances in Equations 6 and 7 and the gyration constant K of the network by changing the ratio of the resistances of resistors 31 and 32 in inverting amplifier 30. Specifically, if the gain of inverting amplifier 30 is increased, the gyration constant K is decreased and vice versa. If, for example, inverting amplifier 30 is given a gain of two, the third term on the left-hand side of Equation 4 becomes.

$$+\frac{-4V_2-V_1}{R_x}$$

and Equation 4 simplifies to Equation 8

$$V_2=I_1\left(\frac{R_x}{4}\right) \quad (8)$$

Since Equation 6 is not affected by the gain of inverting amplifier 30, the gyration constant K becomes $$\left(\frac{R_x}{4}\right)\left(\frac{R_x}{2}\right)=\left(\frac{R_x^2}{8}\right)$$

This is exactly one-half the value of the gyration constant in the original example with inverting amplifier 30 at unity gain. Because a change in gain of amplifier 30 affects the gyration constant, it is possible to couple the present gyrator network with a capacitor to simulate a variable inductor.

It should also be noted that operational amplifier 12 in inverting amplifier 30 might be replaced by a simple transistor in a manner well known in the art to produce the inverting function. The simple transistor can be used because the stability and high quality of the gyrator network shown in the figure is much more dependent on the stability and high gain of amplifiers 10 and 11 than on the stability of inverting amplifier 30.

In the analysis above, resistors 15, 16, 17, 22, 23, 24, 26 and 27 were made equal, each having a resistance $R_x$. It should be noted, however, that in general these resistances may be unequal and that as a result the quality factor of the network changes. If, for example, resistors 15, 16, 17 and 27 are given resistances equal to $R_1$, $R_2$, $R_3$, and $R_4$ respectively and if resistors 22, 23, 24 and 26 are also given resistances equal to $R_1$, $R_2$, $R_3$, and $R_4$, respectively it may be demonstrated that the present network, coupled with capacitors at its input and ouput ports, has a maximum quality determined by Equation 9

$$Q_{max.}=\frac{1+\left(\frac{R_3}{R_2}\right)}{2\left(1-\frac{R_3R_4}{R_1R_2}\right)} \quad (9)$$

Equation 9 shows that the present network has higher quality if the resistances $R_1$, $R_2$, $R_3$, and $R_4$ are more nearly equal to each other. For stability in practical networks, however, it is necessary that the product of $R_3$ and $R_4$ be less than the product of $R_1$ and $R_2$ so that the denominator of Equation 9 does not become negative.

In the embodiment of the invention shown in the figure, terminals 6 and 7 are considered to be input terminals and terminals 8 and 9 are considered to be output terminals. It is to be understood, however, that gyrator action may also be obtained if the input is applied at terminals 8 and 9 and the output taken at terminals 6 and 7.

Thus in accordance with the invention a new gyrator network is made available to the circuit designer, providing him with greater latitude in choice of such circuits than heretofore available.

It is to be understood that the above described circuit arrangement is merely illustrative of applications of the principles of the invention. Numerous other arrangements may be devised by those skilled in the art without departing from the spirit and scope of the invention.

What is claimed is:

1. A gyrator network having an input port with first and second input terminals and an output port with first and second output terminals comprising in combination:
   - first and second operational amplifier circuits each having an intput and an output;
   - an inverting amplifier circuit having an input and an output;
   - means connecting said first input and output terminals to the inputs of said first and second operational amplifiers respectively;
   - means connecting said second input and output terminals to the output of said first and second operational amplifiers respectively;
   - means including impedance means connecting the output of said first operational amplifier to the input of said second operational amplifier;
   - means connecting the output of said second operational amplifier to the input of said inverting amplifier; and
   - means including impedance means connecting the output of said inverting amplifier to the input of said first operational amplifier.

2. A gyrator network having an input port with first and second input terminals and an output port with first and second output terminals comprising in combination:
   - first and second differential amplifier circuits each having first and second input terminals and an output terminal;
   - an inverting amplifier circuit;
   - means connecting said first and second input terminals of said gyrator network to said first and second input terminals of said first differential amplifier;
   - means connecting said first and second output terminals of said gyrator network to said first and second input terminals of said second differential amplifier;
   - means connecting said first and second input terminals of said first differential amplifier to said output terminal of said first differential amplifier;
   - means connecting said first and second input terminals of said second differential amplifier to said output terminal of said second differential amplifier;
   - means connecting said second input terminal directly to said second output terminal of said gyrator network so that said second input and output terminals are maintained at a common electrical potential;
   - means, including impedance means, connecting the output of said first differential amplifier to said first input terminal of said second differential amplifier; and
   - means, including impedance means, connecting said inverting amplifier in the circuit path between the output terminal of said second differential amplifier and the first input terminal of said first differential amplifier so that gyrator action is produced between said input and output ports of said gyrator network.

3. A gyrator network having an input port with first and second input terminals and an output port with first and second output terminals comprising in combination:

first and second differential amplifier circuits each having a positively oriented input terminal, a negatively oriented input terminal and an output terminal;

means connecting said first input terminal of said gyrator network directly to the positively oriented input terminal of said first differential amplifier;

means connecting said first output terminal directly to the positively oriented input terminal of said second differential amplifier;

means connecting said second input terminal directly to said second output terminal of said gyrator network so that said second input and output terminals are maintained at a common electrical potential;

first impedance means connected between said common electrical potential and said negative input terminal of said first differential amplifier circuit;

second impedance means connecting said positively and negatively oriented inputs of said first differential amplifier to the output terminal of said first differential amplifier;

third impedance means connected between said common electrical potential and said negative input terminal of said second differential amplifier;

fourth impedance means connecting the positively and negatively oriented inputs of said second differential amplifier to the output terminal of said second differential amplifier;

an inverting amplifier circuit and a fifth impedance means connected in series in the circuit path between the output of said second differential amplifier and the positively oriented input terminal of said first differential amplifier; and sixth impedance means connected in the circuit path between the output of said first differential amplifier and the positively oriented input terminal of said second differential amplifier, whereby gyrator action is produced between said input and output ports of said gyrator network.

4. A gyrator network having an input port with first and second input terminals and an output port with first and second output terminals comprising in combination:

first and second differential amplifier circuits each having first and second input terminals and an output terminal;

said first input and output terminals of said gyrator network connected respectively to said first input terminals of said first and second differential amplifier circuits;

said second input terminal connected directly to said second output terminal of said gyrator network so that said second input and output terminals are maintained at a common electrical potential;

first and second resistors connected between said common electrical potential and said second input terminals of said first and second differential amplifier circuits;

third and fourth resistors connected respectively between said first and second input terminals of said first differential amplifier and said output terminal of said first differential amplifier;

fifth and sixth resistors connected respectively between said first and second input terminals of said second differential amplifier and said output terminal of said second differential amplifier;

an inverting amplifier circuit having an input and an output terminal;

a seventh resistor connecting the output of said inverting amplifier circuit to the first input terminal of said first differential amplifier circuit;

said input terminal of said inverting amplifier connected directly to the output of said second differential amplifier; and an eighth resistor connected between the output of said first differential amplifier and the first input terminal of said second differential amplifier, whereby gyrator action is produced between said input and output ports of said gyrator network.

References Cited

UNITED STATES PATENTS

| | | | |
|---|---|---|---|
| 3,001,151 | 9/1961 | Sipress et al. | 333—80 |
| 3,098,978 | 7/1963 | Sipress | 333—24 X |
| 3,109,147 | 10/1963 | Witt | 333—24 X |

HERMAN KARL SAALBACH, Primary Examiner

PAUL L. GENSLER, Assistant Examiner

U.S. Cl. X.R.

307—230, 295; 330—85; 333—24